US005462696A

United States Patent [19]

McGinniss et al.

[11] Patent Number: 5,462,696
[45] Date of Patent: Oct. 31, 1995

[54] ELECTRICALLY-CONDUCTIVE AND IONICALLY-CONDUCTIVE POLYMERIC NETWORKS AND THEIR PREPARATION

[75] Inventors: Vincent D. McGinniss, Sunbury; Albert R. Bunk, Columbus, both of Ohio; Hiroyuki Mikuni, Sagamihara, Japan

[73] Assignee: Three Bond Company, Ltd., Tokyo, Japan

[21] Appl. No.: 179,811

[22] Filed: Jan. 10, 1994

Related U.S. Application Data

[63] Continuation of Ser. No. 936,106, Aug. 26, 1992, abandoned.

[51] Int. Cl.⁶ ............................ H01B 1/00; H01B 1/12; H01B 1/20
[52] U.S. Cl. ................ 252/500; 252/518; 252/519; 428/320.2; 428/343; 428/365; 524/84; 524/99; 524/100
[58] Field of Search ........................ 252/518, 500, 252/519; 428/320.2, 343, 365.5; 524/84, 99, 100

[56] References Cited

U.S. PATENT DOCUMENTS

| 3,759,807 | 9/1973 | Osborn et al. | 525/309 |
|---|---|---|---|
| 3,827,957 | 8/1974 | McGinniss | 430/286 |
| 3,827,958 | 8/1974 | McGinniss | 430/286 |
| 3,847,771 | 11/1974 | McGinniss | 525/479 |
| 4,604,427 | 8/1986 | Roberts et al. | 252/500 |
| 5,068,062 | 11/1991 | Inata et al. | 252/518 |
| 5,160,457 | 11/1992 | Eisenbaumer | 252/500 |
| 5,171,478 | 12/1992 | Han | 252/500 |
| 5,281,363 | 1/1994 | Shacklette et al. | 252/500 |

FOREIGN PATENT DOCUMENTS

| 0314311 | 4/1989 | European Pat. Off. ......... H01B 1/12 |
|---|---|---|
| 61-127737 | 6/1986 | Japan . |
| 61-123638 | 11/1986 | Japan . |
| 62-167330 | 7/1987 | Japan . |

OTHER PUBLICATIONS

Changjiang Li et al. "Diffusion-oxidative polymerization of transparent . . . " Synthetic Metals, vol. 40, pp. 23–28 published Apr. 16, 1991.

*Primary Examiner*—Paul Lieberman
*Assistant Examiner*—Gregory R. Delcotto
*Attorney, Agent, or Firm*—Mueller and Smith

[57] ABSTRACT

The present invention relates to polymeric networks that can be made electrically conductive in bulk or which have a surface which is electrically conductive, and which networks exhibit resistivities in the ohm to kilo-ohm range. One aspect of the present invention, then, comprises an electrically conductive polymeric network comprising a cured thermosetting polymeric network which contains an oxidized additive comprising one or more of an oxidizable aniline, thiophene, or pyrrole additive, which additive was oxidized with an oxidizing agent in situ in the cured polymeric network.

6 Claims, No Drawings ered in the liquid carder ingredients.

ELECTRICALLY-CONDUCTIVE AND IONICALLY-CONDUCTIVE POLYMERIC NETWORKS AND THEIR PREPARATION

Cross-Reference to Related Application

This application is a continuation of application U.S. Ser. No. 07/936,106, filed Aug. 26, 1992, now abandoned, the disclosure of which is expressly incorporated herein by reference.

BACKGROUND OF THE INVENTION

The present invention relates to polymeric networks, e.g. films or coatings, that are either ionically or electrically conductive and also which can be made transparent.

Electrical conductivity ordinarily implies opaque metal layers formed into a variety of shapes depending upon the use and current to be carded. A notable exception comprises indium tin oxide (ITO) coatings which are transparent and can be used in digitizers and electronic writing tablets. Ionic conductivity typically comprehends the use of a liquid electrolyte in which mobile ions are used to conduct current between two electrodes held at different potentials. Though some polymeric electrical conductivity has been reported, such electrically conductive polymers typically present a resistance which more fairly should be classified in the semi-conductor range rather than the conductivity range.

BROAD STATEMENT OF THE INVENTION

The present invention relates to polymeric networks that can be made electrically conductive in bulk or which have a surface which is electrically conductive, and which networks exhibit resistivities in the ohm to kilo-ohm range. One aspect of the present invention, then, comprises an electrically conductive polymeric network comprising a cured polymeric network which contains an oxidized additive comprising one or more of an oxidizable aniline, thiophene, or pyrrole additive, which additive was oxidized with an oxidizing agent in situ in the cured polymeric network.

Another aspect of the present invention comprises an ionically-conductive polymeric network cured from a mixture comprising a curable polymer, a metal salt, and an ion transference phase in which said metal salt is soluble. Another aspect of the present invention comprises a polymeric network having a surface comprising a layer of an electrically conductive metal made by the following steps:

forming said polymeric network from a mixture comprising a curable polymer, a metal salt, and an organic solvent in which said metal salt is soluble;

forming a film of said polymeric network mixture;

contacting the surface of said film of said polymeric network mixture with a reducing agent; and curing said film of said polymeric network mixture. Alternatively, the polymeric network can be cured and then contacted with the reducing agent.

Advantages of the present invention include the ability to make highly conductive polymeric networks. Another advantage is the ability to make such electrically conductive polymeric networks which can be formed into a variety of shapes dictated by the content of the continuous polymer phase. Another advantage is the ability to make ionically conductive polymeric networks which also can be formed into a variety of shapes. Yet another advantage is the ability to form conductive electrical layers on polymeric networks, which layers can range from transparent to opaque. These and other advantages will be readily apparent to those skilled in the an based upon the disclosure contained herein.

DETAILED DESCRIPTION OF THE INVENTION

Referring initially to the electrically conductive polymeric networks, the additives comprise aniline, thiophene, or pyrrole, and substituted derivatives thereof. Suitable substituted thiophenes include, for example, 3-methoxythiophene, 3-methylthiophene, 3-ethylthiophene, and 3-n-butylthiophene. A useful substituted pyrrole is 2,5-bisthienylpyrrole. The proportion of additive typically is in the range from between about 1 and 20% by weight.

The polymeric network is formed from monomers, oligomers (e.g. prepolymers), and polymers which can be thermoplastic or thermoset, though preferably ultraviolet (UV) radiation curable monomers and prepolymers are used in forming the electrically conductive polymeric network. Representative ingredients forming the polymeric network include, for example, reactive vinyl monomers such as the lower alkyl esters of acrylic and methacrylic acids or polymers or prepolymers thereof. Vinyl monomers particularly adapted for photopolymerization include, for example, methyl methacrylate, ethyl methacrylate, 2-ethyl hexyl methacrylate, butyl acrylate, isobutyl methacrylate; the corresponding hydroxy acrylates, e.g., hydroxy ethyl acrylate, hydroxy propyl acrylate, hydroxy ethyl hexyl acrylate; also the glycol acrylates, e.g. ethylene glycol dimethacrylate, hexamethylene glycol dimethacrylate; the allyl acrylates, e.g. allyl methacrylate, diallyl methacrylate; the epoxy acrylates, e.g. glycidyl methacrylate; and the aminoplast acrylates, e.g. melamine acrylate. Other ingredients include diallylphthalate, vinyl acetate, vinyl and vinylidene halides, N-vinyl pyrroleidone, and amides, e.g. methyl acrylamide, acrylamide, diacetone acrylamide, butadiene, styrene, vinyl toluene, and the like, and mixtures thereof. Specific preferred UV curable ingredients include acrylic acid, hydroxyethylacrylate, 2-ethylhexylacrylate, trimethylolpropane triacrylate, glycerylpropoxytriacrylate, polyethylene glycol diacrylate, polyethylene oxides, and polyvinyl acetate. A wide variety of additional compounds may be used in forming the polymeric networks as those skilled in the art will appreciate.

Ultraviolet photosensitizers or sensitizers are combined with the monomers or prepolymers used to form the polymeric networks for achieving cure in the presence of UV radiation. Useful UV sensitizers or photosensitizers include halogenated polynuclear ketones such as disclosed in U.S. Pat. No. 3,827,957; and organic carbonyl compounds selected from alkyl phenones, benzophenones, and tricyclic fused ring compounds as disclosed in U.S. Pat. No. 3,759, 807. Further useful UV sensitizers include carbonylated phenol nuclear sulfonyl chlorides, such as set forth in U.S. Pat. No. 3,927,959. Additional useful photosensitizer combinations particularly suited for pigmented formulations are a combination of sensitizers comprising aromatic carbonyl compounds, aromatic aldehydes or aromatic ketones, and a synergistic sensitizer of about 0.05% to about 3% of 2,2'-dithiobis(benzothiazole), as set forth in U.S. Pat. No. 3,847, 771. Typically, at least about 0.5% by weight of the UV sensitizer, and preferably about 1–5% sensitizer, is added to the ingredients and thoroughly mixed or otherwise dispersed in the liquid carder ingredients.

Oxidizing agents which may be appropriate include, for example, persulfates, organic peroxides, perborates, and the like, and even mixtures thereof. The proportion of oxidizing agent can range from as low as about 1% on up to 25% or higher in an appropriate solvent therefor.

In practicing this embodiment of the present invention, the curable ingredients, oxidizable additive, and UV sensitizer are admixed and then drawn down as a film, molded, or otherwise formed into a desired shape, and then exposed to UV radiation for a time sufficient to cure the film. Typical sources of ultraviolet energy ordinarily produce wavelengths in the ultraviolet spectrum that are transmitted through quartz, and such wavelengths are usually between about 1,000 A and 4,000 A. Suitable ultraviolet emitters include various electric arc lamps, plasma arc torches, such as described in U.S. Pat. No. 3,364,487, and lasers having a lasing output in the ultraviolet spectrum. Other suitable sources actinic light include, for example, quartz mercury lamps, ultraviolet quartz lamps, and high flash lamps.

Thereafter, the oxidizing agent is applied to the cured film for oxidizing the aniline, thiophene, or pyrrole oxidizable additive in situ in the cured polymeric network. Optionally, a laminating film (e.g. polyester films or the like) can be placed over the oxidizing agent for the additive to be oxidized. Under such circumstances, it was discovered unexpectedly that not only was the cured polymeric network electrically conductive, but that an electrically-conductive film had transferred to the laminating film also. The examples will demonstrate such phenomena.

For making an ionically conductive polymeric network, the oxidizable additive is replaced by a metal salt which is dissolved in an ion transference phase in which the metal salt is soluble. Appropriate metal salts include, for example, metal acid salts including organic and inorganic acids (e.g. metal carboxylates, metal sulfates, metal chlorides, metal nitrates, and the like), metal hydroxides, metal complexes including organometallic complexes, and the like, and mixtures thereof. Virtually any metal from the Periodic Table of the Elements can be used including, for example, alkali metals, alkaline earth metals, transition series metals, rare earth (lanthanide series) metals, noble metals, and the like, and mixtures therof.

The ion transference phase may be thought of in terms of a plasticizer which is dispersed in the UV curable ingredients and in which the metal salt is dissolved. Depending upon the metal salt of choice, the ion transference phase can include, for example, glycols and polyglycols, esters, carbonates, acids, amines, pyrollidones, ethers, alcohols, polyetheylene oxides, and the like and even mixtures thereof. It will be observed that since ion mobility in the ion transference phase is required for achieving ionic conductivity, the UV curable ingredients should possess a glass transition temperature, $T_g$, which is not much more than about 40° C. above ambient indoor room temperature. The ion transference phase, in turn, is akin to a gel or plasticizer phase therein.

The surface of the ionically conductive polymeric network can be rendered electrically conductive by treating the surface with a reducing agent for forming a conductive metal layer thereon. Appropriate reducing agents typically will comprise an aldehyde or a sugar. Specific preferred reducing agents include, for example, formaldehyde, invert sugar, and the like, and even mixtures thereof.

The electrically conductive metal layer can range in opacity from transparent to translucent to opaque, depending upon the metal salt concentration and reducing time involved. A specific preferred technique for forming metal mirror surfaces on the polymeric network involves the incorporation of a UV sensitizer in with the reducing solution followed by the exposure thereof to UV radiation. Again, in conventional UV curing fashion, the reducing agent can be laminated with a laminating film prior to exposure thereof to UV radiation.

With respect to all of the embodiments disclosed herein, the films readily can be transparent and typically will be based on common UV curable monomers commercially available and used. Incorporation of additional paint additives, however, can be practiced as is necessary, desirable, or convenient in conventional fashion.

The following examples show how the present invention has been practiced, but should not be construed as limiting. In this application, all percentages and proportions are by weight and all units are in the metric system, unless otherwise expressly indicated. All references cited herein are expressly incorporated herein by reference.

EXAMPLE 1

Three (3) grams of a commercial UV curable resin system (Norland 65 resin based on a multifunctional mercaptan and a multifunctional allyl compound, and a photoinitiator such as benzophenone, Norland Chemical Co.) was combined with 0.09 grams of pyrrole or analine and UV cured under a GE® 275 watt sun lamp (General Electric Company) for one minute. A laminating solution of 1–10% ammonium persulfate was applied to the top surface of the UV cured film and then laminated with a clear Mylar® brand polyester film (E. I. du Pont de Nemours and Co.) for 5–60 minutes. The Mylar film was removed from the UV cured film surface, rinsed with water, and dried. The conductivities (as measured by resistance) of both the UV cured film and the transfer film on the Mylar were tested with the following results being recorded.

TABLE 1

| Formulation | Resistivity of UV Cured Film ($\Omega$) | Resistivity of Mylar Transfer Film ($\Omega$) |
| --- | --- | --- |
| Norland 65-Control | $10^{10}$ | $1.4 \times 10^{10}$ |
| Norland 65 with Pyrrole but not oxidized or laminated-Control | $10^{10}$ | $1.4 \times 10^{10}$ |
| Norland 65 with Pyrrole-oxidized and laminated | $14–286 \times 10^3$ | $12–242 \times 10^3$ |
| Norland 65 with 3% Aniline-oxidized and laminated | $289 \times 10^3$ | $200 \times 10^3$ |

The above-tabulated results clearly demonstrate the ability of both pyrrole and aniline to render cured polymeric networks conductive when oxidized. These results also demonstrate the transference of a conductivity layer to the laminating film during the oxidation process.

EXAMPLE 2

Formulations described in Table 2 below were UV cured for 2 to 15 minutes, oxidized with ammonium persulfate or ammonium persulfate/hydrochloric acid, and laminated with Mylar film. Conductivity results recorded also are recorded in Table 2 which follows:

TABLE

| Formulation* (g) | Resistivity of UV Cured Film ($\Omega$) | Resistivity of Mylar Transfer Film ($\Omega$) |
|---|---|---|
| Epon 828 epoxy resin (2) | $1 \times 10^6 - 11 \times 10^{11}$ | $1 \times 10^6 - 11 \times 10^{11}$ |
| Aniline (0.50) | | |
| Cyracure (0.12) | | |
| Hydroxyethylacrylate (3) | $18 \times 10^3$ | $18 \times 10^3$ |
| Pyrrole (0.3) | | |
| Glycerylpropoxytri-acrylate (0.6) | | |
| Irgacure 651 (0.12) | | |

*Epon 828 epoxy resin, Shell Chemical Co.
Irgacure 651 photoinitiator is the ketal of benzil, Ciba Geigy Co.
Cyracure UV1-6974 is $_\phi{}_3S^+SbF_6^-$-cationic photoinitiator, Union Carbide Corp.

The above-tabulated results again demonstrate that oxidation of aniline or pyrrole imparts electrical conductivity to polymeric films.

EXAMPLE 3

The polymeric formulation set forth below was compounded.

TABLE 3

| Ingredient | Amount (g) |
|---|---|
| Copper formate | 0.1–1 |
| Hydroxyethylacrylate | 3 |
| 2,7-Anthraquinonedisulfonic acid sodium salt | 0.3 |
| Sorbitol | 0.3 |
| Ethyleneglycoldiacrylate | 0.3 |
| Irgacure 651 | 2 wt % |

The formulations were drawn down as films on glass plates and then a light sensitive catalyst system consisting of one gram of a 10% solution of citric acid and 2,7-anthraquinonedisulfonic acid sodium salt (90/10 weight ratio) was dropped onto the surface of the films. Finally, a Mylar sheet laminate was applied and the UV curing practiced. The results recorded are set forth below.

TABLE 4

| Cure Conditions | Resistivity ($\Omega$) |
|---|---|
| UV cured without light sensitive catalyst system | $1.8–5 \times 10^6$ |
| UV cured with light sensitive catalyst system and laminated | $258 \times 10^3 – 1.8 \times 10^6$ |

The above-tabulated data demonstrates the ability to form an electrically-conductive metal, viz copper, mirror on the surface of a cured polymeric film. It was difficult to keep the copper metal surface bright, so conductivity was not as high as expected.

EXAMPLE 4

Silver mirrors were prepared from the formulations that were prepared by incorporating silver nitrate/ammonium hydroxide solutions (1–2%) in polymer systems such as a polyacrylic latex (50% solids); polyvinyl acetate dissolved in ethyl alcohol (5–10%) a UV curable resin formulation consisting of 80% hydroxyethylacrylate, 18% glycerylpropoxytriacrylate, and 2% of a photoinitiator (Irgacure 651). Films containing the silver metal ion were formed by air drying the solvent (alcohol or water) from the polymer solutions or by UV light activation of the reactive monomers in the UV curable formulation. The dry or cured films then were laminated with a reducing solution (1–10%) of a water/formaldehyde mixture and Mylar film to produce a metallic mirror surface. Silver mirrors also can be formed by just exposing the top surface of the cured or dry film to the reducing solution. The silver mirrors can be made to be reflective or transparent. Silver mirrors produced in the above-described manner were found to have conductivities (as measured by resistivity) in the range of 1 $\Omega$ to 1,000 $\Omega$.

EXAMPLE 5

The following ingredients were used in making a standard formulation for evaluating various metal salts and various ionic transference phases.

TABLE 5

| Ingredient | Amount (wt %) |
|---|---|
| Hydroxyethylacrylate | 80 |
| Ethyleneglycoldiacrylate | 10–20 |
| Polypropylene glycol | 0–5 |
| Irgacure 651* | 2–3 |
| $Ni(NO_3)_2 \cdot 6H_2O$ | 0.1–6 |
| Ethylene glycol | 0–75 |

*Ketal of benzil photoinitiator, Ciba Geigy Co.

Samples were prepared by mixing the various ingredients together and drawing down the films of the liquid coatings onto glass plates. The liquid coatings then were laminated with clear Mylar® brand sheets and irradiate with a 275 watt GE® sun lamp, after which the sheets were removed. The films then were tested for electrical conductivity.

The amount of ion transfer phase (viz, ethylene glycol) was varied and the affect on ionic conductivity (as measured by electrical resistance) was measured with the following results being recorded.

TABLE 6

| Ethylene Glycol (wt %) | $Ni(NO_3)_2 \cdot 6H_2O$ (wt %) | Resistance ($\Omega$) |
|---|---|---|
| 0 | 6 | $10^7–10^8$ |
| 25 | 6 | $2 \times 10^6$ |
| 50 | 6 | $3.5 \times 10^5$ |
| 75 | 6 | $3.5 \times 10^5$ |

The above-tabulated results demonstrate that increases in the amount of ion transference phase corresponds with an increase in ionic conductivity (as measured by electrical resistance). However, these same results also indicate that there appears to be a maximum amount of ion transference phase content above which there does not appear to be any benefit for improving ionic conductivity.

Next, the amount of ion transference phase and the amount of metal salt both were varied and the affect on ionic conductivity measured with the following results being recorded.

TABLE 7

| Ethylene Glycol (wt %) | Ni(NO$_3$)$_2$·6H$_2$O (moles) | Resistance ($\Omega$) |
| --- | --- | --- |
| 0 | 0.11 | $10^7$–$10^8$ |
| 10 | 0.03 | $10^7$ |
| 25 | 0.07 | $3 \times 10^6$ |
| 50 | 0.11 | $3 \times 10^5$ |
| 75 | 0.18 | $1 \times 10^4$–$2 \times 10^5$ |

The above-tabulated data again demonstrates that the ion transference phase is necessary for achieving ionic conductivity (compare conductivity results for 0 and 50 wt-% ethylene glycol). These results also indicate that increased metal salt content also results in improved conductivities.

We claim:

1. An ultraviolet radiation (UV) cured electrically-conductive polymeric network, which comprises:

a UV cured, thermosetting polymeric network which contains at least about 0.5% by weight of a UV sensitizer selected from one or more of the group consisting of: a halogenated polynuclear ketone; an organic carbonyl compound selected from alkyl phenones, benzophenones, and tricyclic fused ring compounds; carbonylated phenol nuclear sulfonyl chlorides; and aromatic carbonyl compounds, aromatic aldehydes, or aromatic ketones in combination with a synergistic sensitizer of about 0.05% to about 3% by weight of 2,2'-dithiobis(benzothiazole), and between about 1 and 20% by weight of an oxidized additive comprising one or more of an oxidizable aniline, thiophene, or pyrrole additive, which additive was oxidized with an oxidizing agent in situ in the cured polymeric network by applying a solution of said oxidizing agent to a surface of said UV cured, thermosetting polymeric network with a laminating film placed over the applied solution of said oxidizing agent.

2. The electrically-conductive polymeric network of claim 1, wherein said additive is one or more of aniline, thiophene, pyrrole, 3-methoxythiophene, 3-methylthiophene, 3-ethylthiophene, 3-n-butylthiophene, or 2,5-bisthienylpyrrole.

3. The electrically-conductive polymeric network of claim 1 which is transparent.

4. The electrically-conductive polymeric network of claim 1, wherein said oxidizing agent is one or more of a persulfate, an organic peroxide, a perborate, or mixtures thereof.

5. The electrically-conductive polymeric network of claim 1, wherein an electrically conductive film adheres to said laminating film upon its removal from said cured polymeric network.

6. The electrically-conductive polymeric network of claim 5, wherein said laminating film comprises a polyester film.

* * * * *